UNITED STATES PATENT OFFICE.

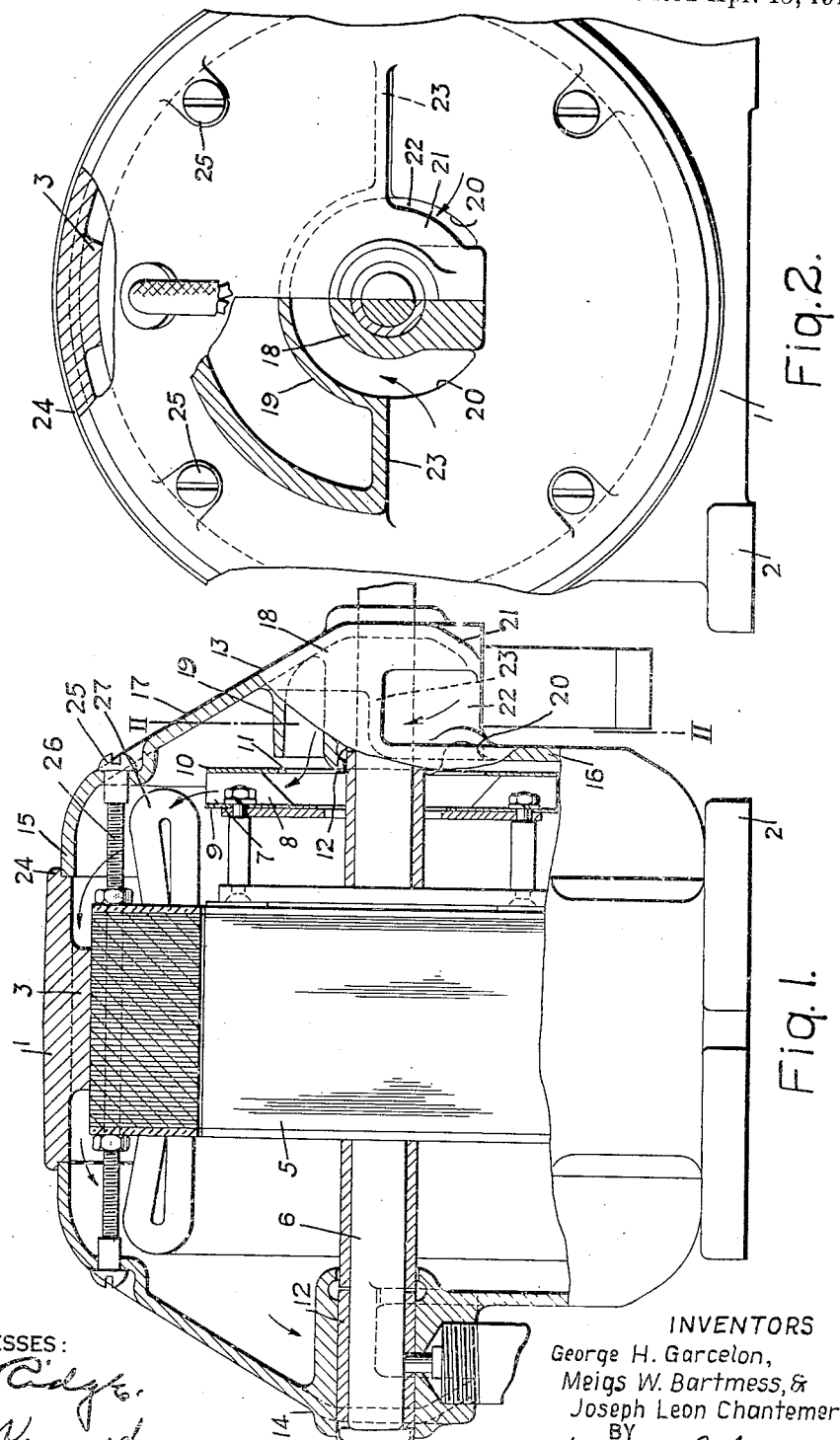

GEORGE H. GARCELON, OF SWISSVALE, MEIGS W. BARTMESS, OF WILKINSBURG, AND JOSEPH L. CHANTEMERLE, OF TURTLE CREEK, PENNSYLVANIA, ASSIGNORS TO WESTINGHOUSE ELECTRIC AND MANUFACTURING COMPANY, A CORPORATION OF PENNSYLVANIA.

DYNAMO-ELECTRIC MACHINE.

1,300,373.  Specification of Letters Patent.  Patented Apr. 15, 1919.

Application filed January 21, 1916. Serial No. 73,319.

*To all whom it may concern:*

Be it known that we, GEORGE H. GARCELON, MEIGS W. BARTMESS, and JOSEPH LEON CHANTEMERLE, citizens of the United States, and residents, respectively, of Swissvale, Wilkinsburg, and Turtle Creek, in the county of Allegheny and State of Pennsylvania, have invented a new and useful Improvement in Dynamo-Electric Machines, of which the following is a specification.

Our invention relates to dynamo-electric machines and particularly to motors of the semi-inclosed type that are exposed to moisture during their operation, such, for example, as motors employed to drive washing machines or similar apparatus.

The object of our invention is to provide a semi-inclosed motor that may be effectively ventilated without permitting the entrance of moisture into the motor under ordinary operating conditions.

In motors of the semi-inclosed type, as hereinbefore constructed, difficulties have been encountered in providing ventilating openings of sufficient size to permit the proper cooling of the motor, without exposing the operating parts of the motor to the action of moisture.

According to the present invention, we provide a motor with end-inclosing members so constructed that the ventilating openings are effectively shielded. Consequently, an ample supply of cooling air may be passed through the motor without the entrance of any appreciable amount of moisture within the motor casing.

In the accompanying drawings, Figure 1 is a view, partially in section and partially in side elevation, of a motor provided with end-inclosing members constructed in accordance with my invention, and Fig. 2 is a view, partially in section along the line II—II of Fig. 1 and partially in front elevation.

The motor comprises a hollow cylindrical frame 1 that is provided with supporting feet 2. The frame 1 is provided, on the inner periphery thereof, with a number of inwardly extending projections 3 that are adapted to position an annular magnetizable core member 4 concentrically within the frame 1. The motor further comprises a rotatable magnetizable member 5 that is mounted on a shaft 6 which carries a fan 7 intermediate the member 5 and one end of the shaft. The fan 7 comprises a plurality of radial blades 8 and disks 9 and 10, the disk 10 being provided with a central opening 11 to form an air inlet passage to the spaces between the fan blades 8. The shaft 6 is rotatably mounted in suitable bearings 12 that are supported in end-inclosing members 13 and 14.

The end-inclosing member 13 comprises an annular rim 15, an upwardly extending wall 16 and a flared-out portion 17. The flared-out portion 17 is of substantially semi-frusto-conical shape and projects beyond the plane of the upwardly extending wall 16. A substantially cylindrical bearing housing 18 is supported, at one end, by the wall portion 16 and, at the other end, by the inner periphery of the flared-out portion 17. A substantially semi-annular flange 19 is formed integral with the portion 17 and projects longitudinally inwardly and is concentric with the bearing housing 18. The diameter of the flange 19 is substantially equal to the diameter of the opening 11 in the disk 10. Openings 20, that are contiguous to the flange 19, are provided in the wall 16 on each side of the bearing housing 18 and are shielded by downwardly extending curved projections 21 of the flared-out portion 17. The spaces 22 between the projections 21 and the edges of the openings 20 are open but the flared-out portion 17 is united to the wall 16 by ribs 23. The rim 15 of the end-inclosing member 13 is adapted to seat in an annular groove 24 provided on the edge of the frame 1, and the member 13 is secured to the frame by means of screw-headed nuts 25 coacting with bolts 26 that project from each side of the laminated magnetizable member 4. When the end-member 13 is secured in position, the rim of the flange 19 is in close proximity to the opening 11 of the disk 10, and the openings 20 and 22 provide continuous passages from the outside air to the fan. The end-inclosing member 14 is substantially similar to the member 13 with the exception that the flange 19 and the ribs 23 are omitted.

From the foregoing, it will be apparent that, when the motor is in operation, air will be drawn in through the passages in the end member 13 and will be directed to the fan intake-opening 11 by the flange 19. The air discharged by the fan will be caused to pass over the coils 27 of the stationary member and through the spaces between the projections 3 to the other side of the motor, as indicated by the arrows. The air will then be discharged outside of the casing through the openings in the end-inclosing member 14. This circulation of air will insure an even temperature in all parts of the motor and, under all ordinary operating conditions, the flared-out portions of the end-inclosing members will effectively shield the ventilating openings from any moisture that might fall upon the motor.

While we have shown our invention as applied to a particular type of motor, it is not so limited but is susceptible of various modifications within the scope of the appended claims.

We claim as our invention:

1. An end-inclosing member for dynamo-electric machines comprising an upwardly extending wall, a flared-out portion projecting beyond said wall, a bearing supported at its ends by said wall and said flared-out portion, and openings located adjacent to said bearing and beneath said flared-out portion.

2. An end-inclosing member for dynamo-electric machines comprising an upwardly extending wall, a flared-out portion projecting beyond said wall, a bearing supported at its ends by said wall and said flared-out portion, and an inwardly extending flange carried by said flared-out portion and concentric with said bearing, the said wall being provided with openings within said flange.

3. An end-inclosing member for dynamo-electric machines comprising an upwardly extending wall, a flared-out portion projecting beyond said wall, and a bearing supported at its ends by said wall and said portion, the said wall being provided with openings located adjacent to said bearing beneath said flared-out portion and the said flared-out portion being provided with downwardly-extending projections shielding said openings.

In testimony whereof, we have hereunto, subscribed our names this 17th day of Jan., 1916.

GEORGE H. GARCELON.
MEIGS W. BARTMESS.
J. L. CHANTEMERLE.